US006822366B2

(12) United States Patent

Strobl

(10) Patent No.: US 6,822,366 B2
(45) Date of Patent: Nov. 23, 2004

(54) BRUSH ASSEMBLY

(75) Inventor: Georg Strobl, Stuttgart (DE)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/098,352

(22) Filed: Mar. 18, 2002

(65) Prior Publication Data

US 2002/0135262 A1 Sep. 26, 2002

(30) Foreign Application Priority Data

Mar. 22, 2001 (GB) .......................................... 0107152

(51) Int. Cl.[7] .............................................. H02K 13/00

(52) U.S. Cl. ...................................... 310/239; 310/244

(58) Field of Search ................................ 310/239, 242, 310/244, 248

(56) References Cited

U.S. PATENT DOCUMENTS 4,085,346 A * 4/1978 Yoshida ...................... 310/246
4,302,379 A * 11/1981 Ueda et al. ................. 524/404

FOREIGN PATENT DOCUMENTS

| | | | |
|---|---|---|---|
| GB | 1 563 207 | 3/1980 | |
| GB | 2 082 399 | 3/1982 | |
| GB | 2 187 044 | 8/1987 | |
| GB | 2 241 944 | 9/1991 | |
| JP | 401295642 A | * 11/1989 | ................ 310/251 |

* cited by examiner

*Primary Examiner*—Dang Le
*Assistant Examiner*—Nguyen N Hanh
(74) *Attorney, Agent, or Firm*—Birch, Stewart, Kolasch & Birch, LLP

(57) ABSTRACT

A brush assembly (10) for a miniature electric motor has a beryllium copper strip brush arm (14) and a graphite material brush head (12) moulded to an end thereof The brush arm (14) has a number of apertures. The brush head (12) has a number of projections which pass through the apertures and form one or more caps (24) on the reverse side of the brush arm to secure the brush head (12) to the brush arm (14). A method of forming the brush assembly is also provided.

11 Claims, 1 Drawing Sheet

BRUSH ASSEMBLY

BACKGROUND OF THE INVENTION

This invention relates to a brush assembly for a miniature electric motor, and to a method of forming the same.

The use of a graphite or graphite-based brush head mounted on a brush arm for use in an electric motor is known. Graphite segment commutators generally use this type of brush. The graphite on graphite interface significantly reduces wear and thus dust. It also generates less electrical noise.

The reduction in wear means that only a very short brush head is required allowing material savings and better space utilization within the motor. However, attachment of a shorter brush to the brush arm proves to be problematic using standard techniques due to the lack of a sizeable brush body to hold. Direct soldering is always difficult and requires a brush body with a high concentration of copper. Due to health reasons, soldering is generally avoided where possible. The common technique of using flaps on the brush arm which are resiliently deformed to grip a portion of the brush requires a significant root portion for the attachment. Hence, there is a need for a secure and reliable engagement of a brush head to a brush arm which overcomes the above mentioned problems.

SUMMARY OF THE INVENTION

According to a first aspect of the present invention, there is provided a brush assembly for a miniature electric motor comprising: a brush arm comprising an elongate strip of resilient conductive material having a distal end and a proximal end, the distal end having a cut out portion; and a brush head of graphite material having a projection residing in the cut out portion and a cap on the projection, the cap securing the brush head to the brush arm.

Preferably, the cut outs are apertures and the brush head has projections passing through the apertures to form one or more caps on the opposite side of the brush arm.

Preferably, the graphite material includes a low temperature thermosetting binder.

Preferably, the binder is cured by a hot pressing process which is used to form the caps.

According to a second aspect, the present invention provides a method of forming a brush assembly for a miniature electric motor, the method comprising the steps of: placing a preformed brush arm having at least one cut out portion in a mould; introducing brush material into the mould; pressing the brush material to form a brush head attached to the brush arm; and pressing the brush material into the at least one cut out portion forming an anchorage integral with the brush head thereby holding the brush head in intimate contact with the brush arm.

Preferably the brush material is substantially graphite mixed with a thermoset resin binder (such as phenolic) which is cured by using a hot pressing process to attach the brush head to the brush arm.

Preferably, the green brush material is introduced into the press die as a billet or as a preformed green brush head.

BRIEF DESCRIPTION OF THE DRAWINGS

The invention will now be more particularly described, by way of example only, with reference to the accompanying drawings, wherein.

DETAILED DESCRIPTION OF THE PREFERRED EMBODIMENTS

Figure 1:
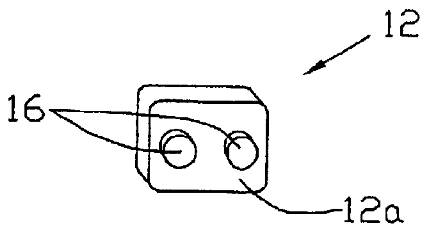
FIG. 1 is a perspective rear view of a first embodiment of a brush head of a brush assembly for a miniature electric motor, in accordance with the present invention.
Figure 2:
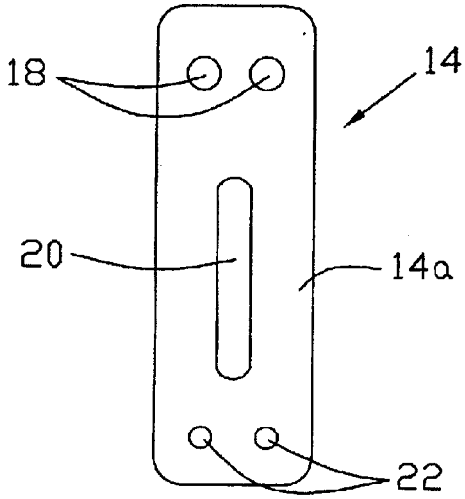
FIG. 2 is a front view of one embodiment of a brush arm of the brush assembly, in accordance with the present invention.
Figure 3:
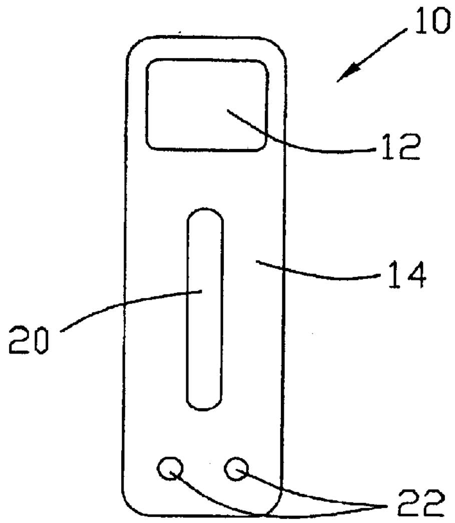
FIG. 3 is a front view of the brush assembly showing the brush head of FIG. 1 being held by the brush arm of FIG. 2.
Figure 4:
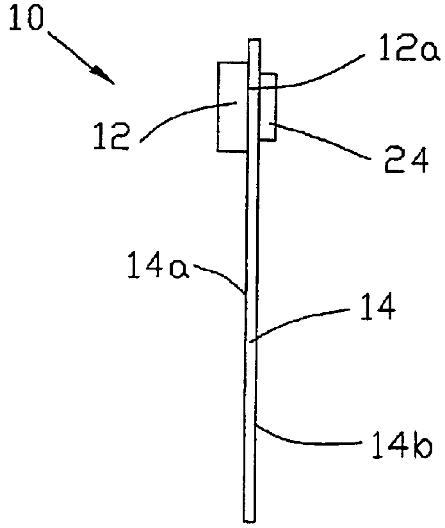
FIG. 4 is a side view of the brush assembly shown in FIG. 3.

Referring now to FIGS. 1 to 4 of the drawings, a first embodiment of a brush assembly, generally referenced by 10 in FIGS. 3 and 4, for an electric motor is shown therein. The brush 10 assembly comprises a brush head 12 and a brush arm 14, typically a leaf-spring type brush arm formed from beryllium copper strip. The brush arm may be plated with tin, nickel, silver or alloys thereof, at least in the region of the brush arm in contact with the brush head.

The brush head 12 is typically formed from a graphite based material having a binder, and is shaped to include a plurality of projections 16. In this embodiment, the brush head 12 is parallelepiped or substantially parallelepiped and the projections 16 extend from a back surface 12*a* thereof. However, the brush head 12 may be of any suitable shape. The binder is preferably a thermoset material, such as phenolic resin or an epoxy.

The brush arm 14 includes a plurality of cut out portions in the form of apertures 18, each of which corresponds to a respective one of the projections 16. The apertures 18 are typically formed at or adjacent to the in use free-end of the brush arm 14, and are dimensioned to receive the projections 16.

The brush arm 14 may also include further apertures or slits 20 (only one shown in FIGS. 2 and 3) which are provided to set the flexibility or resilience of the brush arm, and openings 22 by which the brush arm 14 can be fixed to, for example, a power terminal of an electric motor housing (not shown). However, as these features are well known in the field, further detail will be omitted.

The brush head 12, when mounted on the brush arm 14, also includes an anchorage in the form of one or more caps 24 (one being shown in FIG. 4). Once the brush head 12 has been positioned on the brush arm 14, the free-end of each projection 16 is formed with a respective cap 24, or a single cap 24, which is dimensioned to cover all of the projections 16.

When assembling the brush 10, the graphite based material to be used for the brush head 12 is initially 'green'. This is the state of the material prior to heat treating and, since the binder has not been set or cured, the material can be relatively easily softened and shaped. This 'green' state enables the brush head 12 to be either preformed in a separate pressing process prior to being engaged with the brush arm 14, i.e. the shape of the brush head 12 and the projections 16 can be pre-moulded; or the brush head 12, along with its projections 16 and caps 24, can be formed during the hot pressing process. The apertures 18 are formed in the brush arm 14, typically by pressing out the material of the brush arm 14 at the time the brush arm is stamped from the strip of beryllium copper. The brush head 12 is then overmoulded on to the brush arm 14.

The overmoulding process takes the form of a hot pressing process, which entails hot pressing the green brush material, at a relatively low temperature, for example 200° C., to squeeze the brush material and the brush arm. As the temperature of the green brush material rises, the binder softens or liquefies allowing the brush material to plastically deform. Since only "low temperature" heating occurs, the brush arm is not annealed which would happen if the brush material was sintered, at high temperatures, for example, 400° to 700° C.

Under pressure by the hot pressing process, the plastically deformable brush material tends to fill, block and/or occlude gaps between the brush head 12 and the brush arm 14 thus making intimate contact with the brush arm. On cooling the binder cures hardening the material and the brush head is firmly anchored to the brush arm. A stable and reliable fixing of the brush head 12 to the brush arm 14 is thus produced.

The brush arm 14 may be plated, for example with tin, nickel, silver or another suitable material, to prevent or inhibit oxidation during the overmoulding process.

The green brush material may be introduced into the die by injection, as a blank or as a preformed brush body. The suitability of each process depends in part on the flowability of the material used. More binder increases the flowability but also increases the resistance of the brush head.

For injected material or plain blanks, the material introduced into the die against a first side 14*a* of the brush arm is softened and pressed to flow through the apertures 18 in the brush arm and into a cavity on the reverse side of the brush arm where it forms one or more caps 24 on the end of the projection passing through the apertures.

When using the preformed brush bodies, the projections 16 are placed in the apertures 18 when the green brush material and brush arm are placed in the die and the hot pressing process deforms the ends of the preformed projections 16, to form the caps 24. The preformed brush bodies are preferred when using relatively stiff green brush material due to the smaller amount of movement of the brush material required during the moulding process.

In both cases, the pressing process forms the caps which hold the brush heads to the brush arm and gives a final shape to the body of the brush head, including, if desired, a rilled contact surface having many fine ridges.

Figure 5:
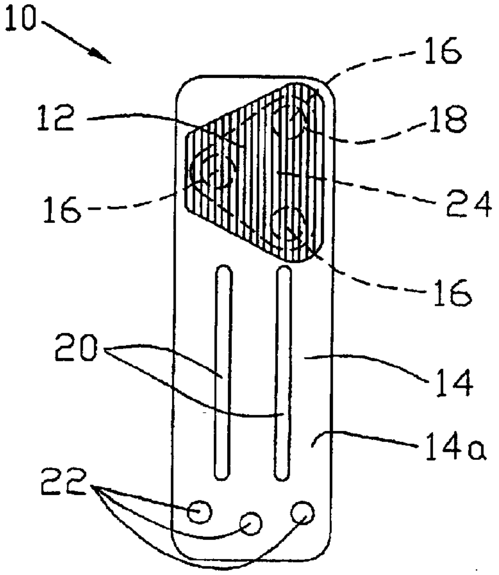
FIG. 5 is a front view of a second embodiment of the brush assembly.

In a second embodiment of the brush 10, shown in FIG. 5, the brush arm 14 has three cut out portions in the form of apertures 18 into which the projections 16 can be inserted or formed. A single cap 24 covers the projections 16 and overlaps onto the rear face or surface 14*b* of the brush arm 14 to bind the brush head 12 to the brush arm 14. In this case, the connection resistance between the brush arm 14 and the brush head 12 will be lower due to the larger contact surface between the two parts.

In a modification (not shown) to the brush assembly 10, the brush arm may have a single aperture. Typically, the aperture will have a non-circular shape to prevent angular displacement of the brush head relative to the brush arm when in use.

Alternatively, the brush arm could have cut out portions along its edges for keying the brush head to the arm. However, apertures are preferred for conservation of graphite material.

Although the resistivity of the brush of the present invention will be high due to the binder being cured and not carbonised or vaporised, this may be partially compensated for by the shortened length of the brush head 12.

A brush for an electric motor that has a brush head which is securely and reliably attached to a brush arm and which is particularly suited to brushes of a short length can thus be provided.

The embodiments described above are given by way of example only, and various modifications will be apparent to persons skilled in the art without departing from the scope of the invention as defined by the appended claims.

What is claimed is:

1. A brush assembly for a miniature electric motor comprising:

a brush arm comprising an elongate strip of resilient conductive material having a distal end and a proximal end, the distal end having a cut out portion; and a brush head of graphite material molded to said brush arm and having a projection residing in the cut out portion and a cap mounted on the projection, the cap securing the brush head to the brush arm.

2. The assembly of claim 1, wherein the brush arm has a number of cut out portions in the form of apertures and the brush head has a corresponding number of projections, each projection having a respective cap.

3. The assembly of claim 1, wherein the brush arm has a number of cut out portions in the form of apertures and the brush head has a corresponding number of projections and a number of caps with the or each cap being formed on one or more of the projections.

4. The assembly of claim 3, wherein the brush head has a single cap formed on the distal end of all of the projections.

5. The assembly of claim 1, wherein the or each cap is integrally formed with the or each projection.

6. The assembly of claim 1, wherein the graphite material of the brush head includes a low temperature thermosetting binder.

7. The assembly of claim 6, wherein the brush head is attached to the brush arm using a hot pressing process.

8. The assembly of claim 6, wherein the binder is cured by a hot pressing process.

9. The assembly of claim 7, wherein the binder is phenolic resin.

10. The assembly of claim 1, wherein the brush arm is of beryllium copper and is plated with a material selected from the group consisting of tin, nickel, silver and alloys thereof, at least in the region in contact with the brush head.

11. A brush assembly for a miniature electric motor, comprising:

a brush arm comprising an elongate strip of resilient conductive material having a distal end and a proximal end, the distal end having a cut out portion; and a brush head of graphite material having a projection residing in the cut out portion and a cap on the projection, the cap securing the brush head to the brush arm;

wherein compression of the projection is avoided during installation of the brush head.

* * * * *